June 20, 1944. W. C. OLIVER, 2D 2,352,001
CONTROL VALVE FOR BRAKES
Filed Feb. 19, 1941 2 Sheets-Sheet 1

INVENTOR
WILBUR C. OLIVER II
BY
ATTORNEY

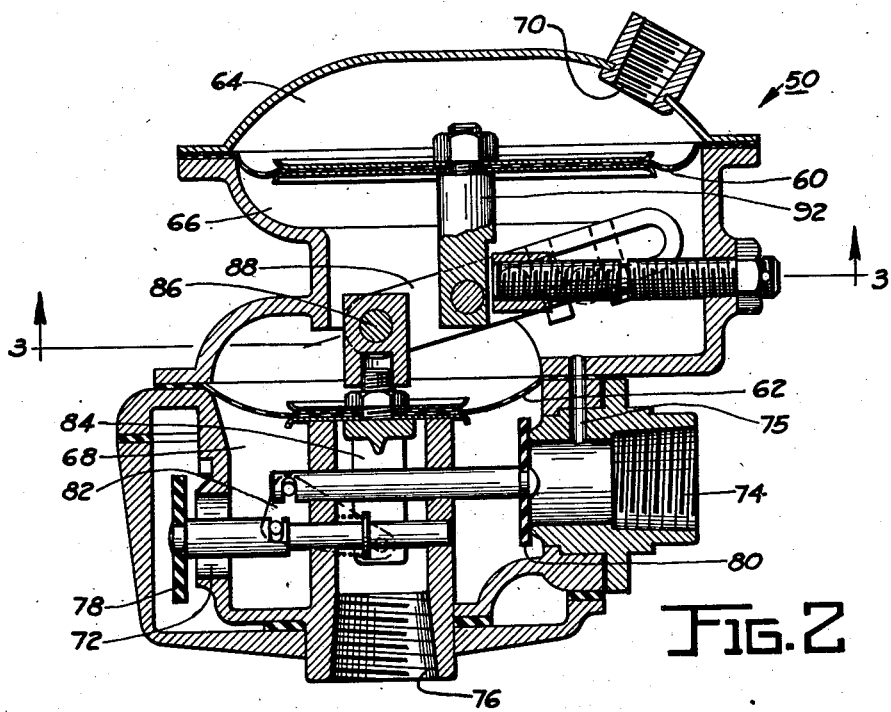
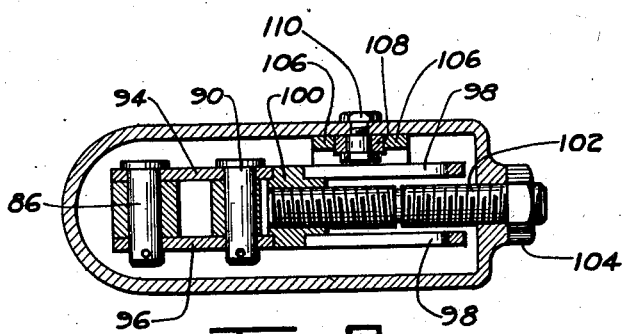

Patented June 20, 1944

2,352,001

UNITED STATES PATENT OFFICE 2,352,001

CONTROL VALVE FOR BRAKES

Wilbur C. Oliver, 2nd, Detroit, Mich., assignor to Bendix Aviation Corporation, South Bend, Ind., a corporation of Delaware Application February 19, 1941, Serial No. 379,589

17 Claims. (Cl. 188—3)

This invention relates to power controls for brake systems, and more particularly to a power system for automobile brakes comprising a plurality of motors and a valve for regulating one motor in response to the action of the other.

The invention will be illustrated as embodied in a braking system for a tractor-trailer vehicle combination. Schematically, the system comprises a tractor power cylinder, a trailer power cylinder, a conduit connecting the two cylinders, and a valve interposed in the conduit which responds to the actuation of the tractor cylinder and which in turn controls the actuation of the trailer cylinder.

I shall describe a pair of differential air pressure motors as applied to the brakes of a tractor and trailer. In such a combination, it is often desirable to regulate the application of the trailer brakes relative to the application of the tractor brakes. The time at which the trailer brakes start to be applied relative to the time the tractor brakes start to be applied has been regulated by different types of adjustable valves. Ordinarily, however, it is desirable to have the two power motors start applying the brakes at approximately the same time, and to adjust the relative speed of application of the two braking systems, i. e., to adjust the ratio of tractor power to trailer power.

By designing a valve with the necessary dimensions it is, of course, possible to predetermine the ratio of tractor power to trailer power. Thus, a relay valve may be used which will, in every application of the brakes, cause twice as much pressure to be dumped into the trailer brakes as into the tractor brakes. But, whereas such a ratio may be desirable under some circumstances, there are many instances in which it is not optimum.

It is, therefore, an important object of my invention to provide an adjustable control valve which will allow the power ratio of tractor to trailer brakes to be adjusted at the will of the operator, and whenever change seems desirable.

A second object of my invention is to provide a system of power controls which at all times operates at a maximum efficiency in controlling the units associated therewith.

Other objects and advantages of my device will become apparent during the course of the following description. In the description reference will be had to the accompanying drawings, in which:

Figure 2 shows in sectional elevation the control valve of Figure 1; and

Figure 3 is a section taken on the line 3—3 of Figure 2.

Figure 1:
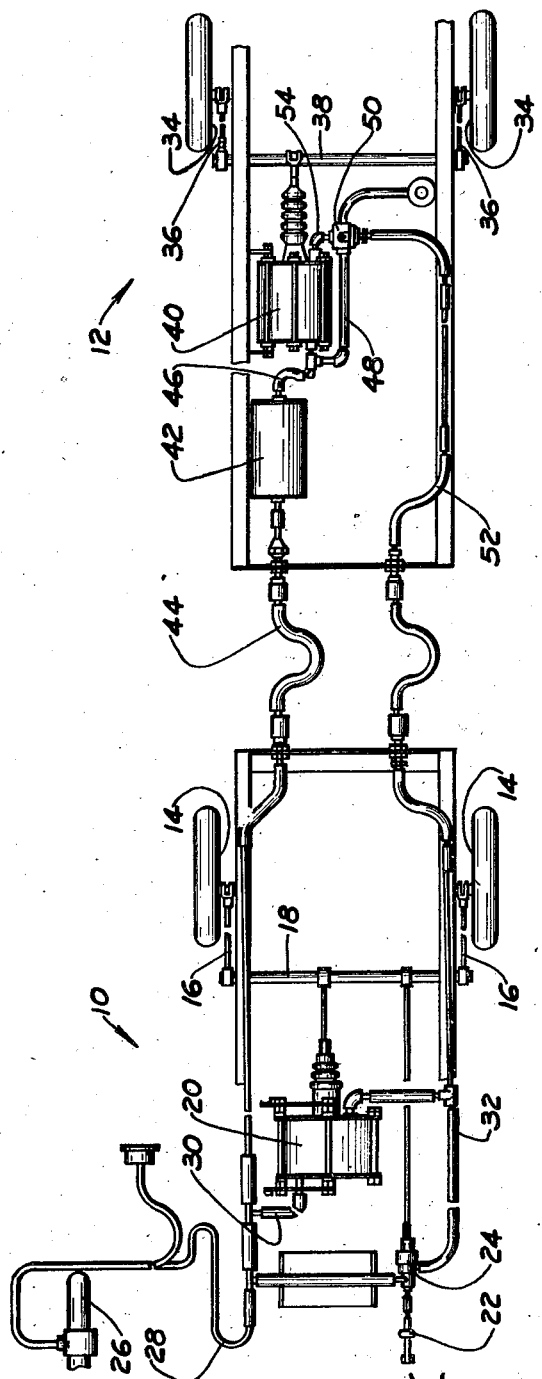
Figure 1 represents diagrammatically a tractor-trailer power brake hookup incorporating my invention.

In Figure 1, I have shown a tractor 10 and a trailer 12. The tractor has brakes 14 connected by brake linkage 16 to a cross shaft 18 which is in turn connected to a power cylinder 20 of the vacuum suspended type. A brake pedal 22 is adapted to actuate a brake control valve 24. A manifold 26, associated with the usual internal combustion engine of the tractor, has a vacuum conduit 28 leading therefrom to the valve 24. A branch vacuum conduit 30 connects conduit 28 to the left side of the power cylinder 20. A control conduit 32 connects the valve 24 to the right side of the power cylinder 20.

The trailer 12 is provided with brakes 34 connected by brake linkage 36 to a cross shaft 38 which is arranged to be actuated by a power cylinder 40. A vacuum reserve tank 42 is provided on the trailer, and is connected by a branch vacuum conduit 44 to the conduit 28 and the tractor source of vacuum. The left side of trailer power cylinder 40 is at all times connected to the vacuum tank 42 by a vacuum conduit 46. A branch vacuum conduit 48 connects the conduit 46 to a valve 50, this being the valve shown in detail in Figures 2 and 3. A branch control conduit 52 connects the valve 50 to the conduit 32, and a trailer control conduit 54 connects the valve 50 to the right side of the power cylinder 40.

The manner of operation of the tractor brakes in response to movement of the brake pedal 22 is well known to the art. A description of the operation of the valve 24 and of the tractor brakes in response thereto may be found in Bragg et al. Patents Nos. 1,803,957 and 2,037,788. Cracking of the valve 24 causes air at atmospheric pressure to enter conduit 32. This air, supplanting the vacuum which is normally (i. e., while the brakes are released) maintained in conduit 32, enters the right side of the power cylinder 20 and moves the piston therein (not shown) to the left, applying the tractor brakes. At the same time, the air in conduit 32 supplants wholly or partially the vacuum in conduit 52 and moves to the valve 50 to operate the said valve, and thereby operate the trailer brakes.

The valve 50 is divided by diaphragms 60 and 62 into three chambers, 64, 66 and 68. The chamber 64 is connected through a port 70 to the control conduit 52. The chamber 68 is provided with three ports, 72, 74 and 76. The port 72 is connected with atmosphere, the port 74 is connected with the vacuum conduit 48, and the port 76 is connected with the trailer control conduit 54. A passage 75 through the casing of the valve 50 connects the chamber 66 to the vacuum port 74, so that the chamber 66 is at all times open to line vacuum. Poppet valves 78 and 80 are provided for controlling respectively the port 72 and the port 74. The valves 78 and 80 are secured to and actuated by a triangular lever 82, which in turn is operated by the movements of a rod 84. The rod 84 is secured by suitable means to the diaphragm 62 and moves therewith.

A pin 86 fixes the upper end of the rod 84 to one end of an adjusting lever 88. A second pin 90 fixes the lower end of a rod 92 to the lever 88 at a point to the right of the pin 86.

The lever 88, as shown in Figure 3, has forks 94 and 96, through which each of the pins 86 and 90 extends. The forks 94 and 96 of the lever 88 are provided with cut-out portions 98, in which a trunnion 100 is adapted to slide. As will be more clearly explained below, the trunnion 100 at all times serves as the fulcrum about which the lever 88 moves. One end of the screw 102 is screwed into the trunnion 100, and the other end of the screw 102 extends outwardly through the casing of the valve 50, being engaged outside of the valve casing by a lock nut 104. One end of the screw 102 is provided with a left hand thread while the other end of the screw is provided with a right hand thread. By adjustment of the screw 102, therefore, the position of the trunnion 100 may be changed, and the distance of the lever fulcrum from the pins 86 and 90 may be varied. In order that the lever 88 may move up or down without being allowed movement in any other direction, a pair of extensions 106 on the lever 88 are folded over the sides thereof and are adapted to be engaged by a roller 108, which lays between the said extensions 106. The roller 108 is fixed by a bolt 110 to the casing of the valve 50. Thus the lever 88 is definitely positioned by the roller 108, although up and down movement of the lever is allowed.

The operation of applicant's invention will now be described. When the brakes are in the released position, the tractor power cylinder is suspended in vacuum and vacuum is communicated through the conduit 52 to the chamber 64 of valve 50. The diaphragms 60 and 62 are maintained in their uppermost position and the rod 84 holds the air port 72 closed and the vacuum port 74 open maintaining chamber 68 of the valve in vacuum and allowing vacuum to be communicated through port 76 and conduit 54 to the power cylinder 40, thus maintaining the power cylinder suspended in vacuum.

Since the chamber 66 is at all times open to vacuum through the passage 75, the forces above diaphragm 60 and below diaphragm 62 will be acting against the prevailing pressure in the vacuum line, and the same pressure will exist under the diaphragm 60 as exists over the diaphragm 62.

As will be remembered, pressure from the control line 52 is admitted during application of the brakes to the chamber 64 through port 70 of the valve 50. The pressure prevailing in chamber 64 will therefore be the same as the pressure which is actuating the tractor power cylinder. The pressure in chamber 64 exerts a downward force on the diaphragm 60 which moves downward carrying with it the rod 92. The rod 92 swings the lever 88 about its fulcrum bar 100, thus moving the rod 84 downward to first close the vacuum port 74 and to later open the atmospheric port 72 admitting air to the chamber 68 and thence through the port 76 to the right side of the power cylinder 40 moving the piston therein to apply the trailer brakes. Air will continue to rush into chamber 68 until the upward force caused by pressure of the air in chamber 68 against diaphragm 62 is sufficient to balance the downward force caused by pressure of the air in chamber 64 against the diaphragm 60, the relation of the balancing forces being determined by the leverage ratios over the lever 88. When the upward force on the rods 84 and 92 balances the downward force thereon, the valve 50 will be in lapped position, i. e., both ports 72 and 74 will be closed and no further pressure will be admitted to the power cylinder 40. When the tractor brakes are released, the air in the line 52 will be drawn into the manifold of the tractor and the downward pressure on diaphragm 60 will be decreased, allowing the rods 92 and 84 to move upward closing the port 72 and opening the port 74 to evacuate the right side of the trailer power cylinder 40.

It will be understood that the ratio of power applied in braking the tractor to power applied in braking the trailer will be determined by two factors, (1) the relative size of the diaphragms 60 and 62 (2) the leverage ratios at which the rods 84 and 92 apply force to the lever 88.

By making the diaphragm 60 substantially larger than the diaphragm 62, considerable leeway is allowed for adjusting the valve 50. Thus the operator may, by moving the screw 102 as desired, vary the ratio of tractor braking to trailer braking over quite a wide field. For example, if the diaphragm 60 has an area twice that of the diaphragm 62 and the distance of pin 86 from bar 100 is twice that of pin 92 from bar 100, the pressure applied to the trailer brakes will equal that applied to the tractor brakes, that is to say, the two braking systems will advance toward complete application of the brakes at equal rates. If the screw 102 and with it the bar 100 are now moved outward until the pin 86 is only 1½ times as far from the bar 100 as is the pin 90, the pressure required in chamber 68 before the valve will move to lapped position will be 1⅓ times the pressure prevailing in the chamber 64. It will be obvious to those skilled in the art that an infinite number of variations will thus be attainable by merely adjusting the screw 102.

I claim:

1. In a fluid pressure braking system for a tractor trailer vehicle combination, power brakes for the tractor, power brakes for the trailer, a conduit therebetween, means interposed in said conduit controlled by the pressure of the tractor brakes and controlling the pressure of the trailer brakes, said means being adapted to so regulate the trailer power brakes in response to actuation of the tractor power brakes that a constant ratio is maintained between the pressure of the tractor brakes and the pressure of the trailer brakes, and means for manually adjusting the aforesaid means to vary the pressure of the trailer brakes induced by a given pressure of the tractor brakes.

2. A pressure control valve for brakes comprising a casing having a pair of pressure chambers therein, a pair of elements one of which is responsive to the pressure in one of said chambers and the other of which is responsive to the pressure in the other of said chambers, one of said elements having a greater pressure responsive area than the other, a lever of the second order connected at one point to one of the pressure responsive elements and at another point to the other of the pressure responsive elements, an adjusting screw which extends through the casing of the valve, and a trunnion controlled by said screw and serving as fulcrum for the lever.

3. For use with a system of power operated brakes for automotive vehicles comprising a differential air pressure power brake system for a tractor vehicle, and a differential air pressure power brake system for a trailer vehicle; a control having a chamber open to the pressure prevailing in the differential air pressure brakes of the tractor, a pair of valves controlling the differential air pressure brakes of the trailer, means for controlling the valves in response to variations in pressure in the chamber, pressure responsive means for resisting the actuation of the aforesaid controlling means in proportion to the pressure prevailing in the differential air pressure power brakes of the trailer, and means for varying the amount of resisting pressure necessary to counteract a given controlling pressure in the chamber.

4. A braking system for a tractor and trailer vehicle combination comprising brakes for the tractor, brakes for the trailer, a plurality of differential air pressure power motors one for operating the tractor brakes and one for operating the trailer brakes, connections between said tractor and trailer power motors, valve means interposed in said connections for controlling the operation of one of said power motors in response to the operation of the other of said power motors, said valve means being balanced between the action of the controlling pressure and the reaction of the controlled pressure, and manually operable means for varying the ratio between controlling pressure and controlled pressure necessary to bring the valve means to balanced position.

5. In combination, a differential air pressure power cylinder for brakes, valve means connected to and actuated in proportion to the pressure prevailing in the aforesaid power cylinder, a second differential air pressure power cylinder connected to the valve and actuated by the valve, means associated with the valve for controlling the pressure of the second cylinder according to the pressure of the first cylinder, and means associated with the valve for varying the pressure created in the second cylinder by a given pressure in the first cylinder.

6. In a fluid pressure braking system for a tractor trailer vehicle combination, power brakes for the tractor, power brakes for the trailer, a conduit therebetween, and means interposed in said conduit for regulating the trailer power brakes in response to actuation of the tractor power brakes, said regulating means comprising an element responsive to pressure, an element for exerting control over pressure, means for transferring impulses from said pressure responsive element to said pressure controlling element, and means associated with said transferring means for varying the effect on said pressure controlling element caused by a given pressure on said pressure responsive element.

7. For use with a system of power operated brakes for automotive vehicles comprising a differential air pressure power braking system for a tractor vehicle, and a differential air pressure power brake system for a trailer vehicle; an adjustable rate relay valve having a plurality of pressure chambers one connected to the tractor power brake system and another connected to the trailer power brake system, a plurality of movable pressure responsive walls between the chambers, means connected to said movable walls so that movement of one occasions movement of another, and means for varying the amount of force which a given pressure on one movable wall exerts in moving another movable wall while causing the ratio of said force to said pressure to remain constant throughout the operating range.

8. For use with a system of power operated brakes for automotive vehicles comprising a differential air pressure power brake system for a tractor vehicle, and a differential air pressure power brake system for a trailer vehicle; an adjustable rate relay valve having a plurality of pressure chambers one connected to the tractor power brake system and another connected to the trailer power brake system, a pair of elements, one movable with each of said diaphragms, a lever connected to both of said elements, and means for adjusting the distance of the fulcrum of said lever from the said elements.

9. For use with a system of power operated brakes for automotive vehicles comprising a differential air pressure power brake system for a tractor vehicle, and a differential air pressure power brake system for a trailer vehicle; an adjustable rate relay valve having a plurality of pressure chambers one connected to the tractor power brake system and another connected to the trailer power brake system, a plurality of diaphragms associated with said chambers, means conducting pressure to one of said diaphragms, means associated with the other of said diaphragms for bringing about pressure change, means causing the force exerted upon the first of said diaphragms to exert a force upon the second of said diaphragms, and means for varying the ratio between the force exerted by the first of said diaphragms and the force exerted on the second of said diaphragms.

10 For use with a system of power operated brakes for automotive vehicles comprising a differential air pressure power brake system for a tractor vehicle, and a differential air pressure power brake system for a trailer vehicle; a control valve having a plurality of pressure chambers one connected to the tractor power brake system and another connected to the trailer power brake system, a pair of elements one of which is responsive to the pressure in one of said chambers and the other of which is responsive to the pressure in the other of said chambers, a lever connected to one of said elements at one point and to the other of said elements at a second point, and a manually adjustable element on which said lever fulcrums.

11. In a fluid pressure braking system for a tractor trailer vehicle combination, power brakes for the tractor, power brakes for the trailer, a conduit therebetween, and means interposed in said conduit for regulating the trailer power brakes in response to actuation of the tractor power brakes, said regulating means comprising a pressure control device having a chamber which is at all times subject to controlling pressure, a second chamber which is at all times subject to controlled pressure, a pair of valves regulating the pressure in the second chamber, means for alternately opening and closing said valves, a diaphragm connected to said means, a lever connected to said diaphragm, means for subjecting the lever to force corresponding to pressure prevailing in the first pressure chamber, and means for varying the length of the lever arm through which said force is applied.

12. In a fluid pressure braking system for a tractor-trailer vehicle combination, differential air pressure power brakes for the tractor, differential air pressure power brakes for the trailer, a conduit therebetween, and means interposed in said conduit for regulating the trailer power brakes according to actuation of the tractor power brakes, said regulating means comprising an element responsive to the pressure prevailing in the tractor power brakes, an element responsive to the pressure prevailing in the trailer power brakes, a connection between said elements which is urged in one direction by tractor pressure and in the opposite direction by trailer pressure, and manually operable means associated with said connection for varying the relative effectiveness of a given tractor pressure to a given trailer pressure.

13. A fluid pressure braking system for a tractor-trailer vehicle combination comprising a power motor for actuating the tractor brakes, an operator operated valve for controlling the tractor power motor, a power motor for actuating the trailer brakes, and a relay valve for controlling the trailer power motor in accordance with the control exerted over the tractor power motor by the first mentioned valve, said relay valve having means for maintaining a constant power ratio between the tractor and trailer power motors during the operating range and manually operable means adjustable to vary the power ratio between the tractor and trailer power motors while retaining the constancy of ratio through the operating range.

14. A fluid pressure braking system for a tractor-trailer vehicle combination comprising a power motor for actuating the tractor brakes, a valve for controlling the tractor power motor, a power motor for actuating the trailer brakes, and a valve for automatically controlling the trailer power motor in accordance with the control exerted over the tractor power motor by the first mentioned valve to maintain a constant power ratio between the motors throughout the range of power operation, the last mentioned valve having manually operable means adjustable to vary the power ratio between the tractor and trailer power motors while retaining the constancy of ratio through the operating range.

15. A fluid pressure braking system comprising a first power motor, primary valve means for actuating the first power motor, a second power motor, secondary valve means controlled by the primary valve means and automatically operable to actuate the second power motor maintaining a constant ratio of power between the first and second power motors throughout the operating range of the motors, and manually controlled means associated with the secondary valve means for changing the constant ratio of power admitted to the motors.

16. A fluid pressure braking system comprising a first fluid pressure actuated motor, primary valve means for operating the first motor, a second fluid pressure actuated motor, secondary valve means controlled by the primary valve means and which automatically operates the second motor in such a way as to maintain a constant ratio of fluid pressure between the first and second motors throughout the operating range of the motors, and an adjustor associated with the secondary valve means for varying the constant ratio of the fluid pressure admitted to the motors.

17. For use with a system of power operated brakes for automotive vehicles comprising a differential air pressure power brake system for a tractor vehicle, and a differential air pressure power brake system for a trailer vehicle; an adjustable rate relay valve having a plurality of pressure chambers one connected to the tractor power brake system and another connected to the trailer power brake system, a pair of elements one of which is responsive to the pressure in one of said chambers and the other of which is responsive to the pressure in the other of said chambers, a lever of the third order connected at one point to one of the pressure responsive elements and at another point to the other of the pressure responsive elements, an adjusting screw which extends through the casing of the valve, and a trunnion controlled by said screw and serving as fulcrum for the lever.

WILBUR C. OLIVER, 2ND.

CERTIFICATE OF CORRECTION.

Patent No. 2,352,001. June 20, 1944.

WILBUR C. OLIVER, 2ND.

It is hereby certified that error appears in the printed specification of the above numbered patent requiring correction as follows: Page 1, second column, line 38, for the patent number "2,037,788" read --2,037,758--; and that the said Letters Patent should be read with this correction therein that the same may conform to the record of the case in the Patent Office.

Signed and sealed this 8th day of May, A. D. 1945.

Leslie Frazer

(Seal) Acting Commissioner of Patents.